United States Patent
Gach (10) Patent No.: US 9,819,589 B2
(45) Date of Patent: Nov. 14, 2017

(54) CAN FD END-OF-FRAME DETECTOR, CAN BIT STREAM PROCESSING DEVICE, METHOD FOR DETECTING THE END OF A CAN FD FRAME, AND METHOD OF OPERATING A CAN BIT STREAM PROCESSOR

(71) Applicant: FREESCALE SEMICONDUCTOR, INC., Austin, TX (US)

(72) Inventor: Robert Gach, Seysses (FR)

(73) Assignee: NXP USA, Inc., Austin, TX (US)

(*) Notice: Subject to any disclaimer, the term of this patent is extended or adjusted under 35 U.S.C. 154(b) by 114 days.

(21) Appl. No.: 15/023,448

(22) PCT Filed: Sep. 27, 2013

(86) PCT No.: PCT/IB2013/002529
§ 371 (c)(1),
(2) Date: Mar. 21, 2016

(87) PCT Pub. No.: WO2015/044705
PCT Pub. Date: Apr. 2, 2015

(65) Prior Publication Data
US 2016/0234117 A1  Aug. 11, 2016

(51) Int. Cl.
*H04L 12/801* (2013.01)
*H04L 12/413* (2006.01)
(Continued)

(52) U.S. Cl.
CPC ........ *H04L 47/10* (2013.01); *H04L 12/40039* (2013.01); *H04L 12/4135* (2013.01); *H04L 69/22* (2013.01); *H04L 2012/40215* (2013.01)

(58) Field of Classification Search
CPC ............... H04L 47/10; H04L 12/40039; H04L 12/4135; H04L 69/22; H04L 2012/40215
See application file for complete search history.

(56) References Cited

U.S. PATENT DOCUMENTS

| | | | |
|---|---|---|---|
| 2014/0156893 A1* | 6/2014 | Monroe | G06F 13/372 710/117 |
| 2014/0280636 A1* | 9/2014 | Fredriksson | H04L 29/0619 709/206 |
| 2014/0337549 A1* | 11/2014 | Hartwich | H04L 12/4013 710/106 |

FOREIGN PATENT DOCUMENTS

EP   2 521 319 A1   11/2012

OTHER PUBLICATIONS

Anonymously; "CAN-FD Blocker / Interceptor Concept"; ip.com; 5 pages (Oct. 4, 2012).
(Continued)

*Primary Examiner* — Jae Y Lee
(74) *Attorney, Agent, or Firm* — Charlene R. Jacobsen (57) ABSTRACT

A CAN FD frame comprises one or more portions provided at a normal bit rate that includes an end-of-frame field consisting of a succession of at least seven recessive bits. A method for detecting the end-of-frame of a CAN FD frame in an input bit stream entails providing a recessive bit count; defining a stretched bit transmission time longer than the bit transmission time associated with the high data rate; stretching the bit transmission time of each dominant bit succeeding a recessive bit in the input bit stream to the stretched bit transmission time to generate a conditioned input bit stream; sampling the conditioned input bit stream at a bit counter rate to generate a sampled bit stream; resetting the recessive bit count in response to each dominant bit in the sampled bit stream; and incrementing the recessive bit count in response to each recessive bit in the sampled bit stream.

9 Claims, 3 Drawing Sheets

(51) Int. Cl.
*H04L 29/06* (2006.01)
*H04L 12/40* (2006.01)

(56) References Cited

OTHER PUBLICATIONS

Bosch; "CAN with Flexible Data-Rate, Specification Version 1.0"; 33 pages (Apr. 17, 2012).
Elend, Bernd et al., NXP; "CAN partial networking & CAN FD"; ip.com—Technical Disclosure; 7 pages (Dec. 15, 2011).
International Search Report for application No. PCT/IB2013/002529 (May 26, 2014).

* cited by examiner

CAN FD END-OF-FRAME DETECTOR, CAN BIT STREAM PROCESSING DEVICE, METHOD FOR DETECTING THE END OF A CAN FD FRAME, AND METHOD OF OPERATING A CAN BIT STREAM PROCESSOR

FIELD OF THE INVENTION

This invention relates to a CAN FD end-of-frame detector, a CAN bit stream processing device, a method for detecting the end of a CAN FD frame, and a method of operating a CAN bit stream processor.

BACKGROUND OF THE INVENTION

CAN FD is a communication protocol that evolved from the CAN protocol developed by BOSCH and which is widely used in automotive and other applications. CAN is described in the ISO 11898 specification. With CAN and also with CAN FD, data is transmitted in data packets referred to as frames. The frame format of CAN FD is however different compared to CAN. Notably, a CAN FD frame may comprise data portions transmitted at different bit rates. More specifically, a CAN FD frame may comprise an arbitration phase in which a normal bit rate is used followed by a data phase in which a high bit rate higher than the normal bit rate is used. In a CAN frame, in contrast, the normal bit rate is used throughout the frame.

A CAN network may comprise devices which support CAN FD as well as devices which do not. For example, a CAN network may comprise a first and a second device supporting both CAN and CAN FD, and a third device supporting only a CAN. In this case, the first and the second device may communicate with each other using CAN FD and with the third device using CAN.

A problem may arise in that a CAN device receiving a CAN FD frame may detect the CAN FD frame as errored, possibly resulting in an unjustified error counter overflow. Furthermore, a non CAN FD passive device used within a selective wakeup (SWU) partial networking (PN) network may initiate an unnecessary wakeup in response to receiving a CAN FD frame, due to detecting the frame as errored. This may cause unnecessary power consumption.

A CAN device suitable for operating in a CAN SWU/PN network may be desired to be CAN FD passive. A CAN FD passive device is a device which, roughly speaking, ignores any received CAN FD frame and takes no action in response to the CAN FD frame. More specifically, a CAN FD passive device should not, in response to receiving a CAN FD frame, perform any of the following actions: (1) initiating a wakeup procedure, (2) interpreting the frame content, (3) indicating that the frame is errored, (4). incrementing or decrementing its internal receiver (RX) error counter (REC). The CAN FD passive device should however be capable of detecting a CAN frame received before or after the CAN FD frame.

A CAN frame may be in the CAN base format or in the CAN extended format. Similarly, a CAN FD frame may be in the CAN FD base format or in the CAN FD extended format. These formats are specified in "CAN with flexible data rate—specification—version 1.0" released by BOSCH on Apr. 17, 2012, which is incorporated herein by reference.

SUMMARY OF THE INVENTION

The present invention provides a CAN FD end-of-frame detector, a CAN bit stream processing device, a method for detecting the end of a CAN FD frame, and a method of operating a CAN bit stream processor as described in the accompanying claims.

Specific embodiments of the invention are set forth in the dependent claims.

These and other aspects of the invention will be apparent from and elucidated with reference to the embodiments described hereinafter.

DETAILED DESCRIPTION OF THE PREFERRED EMBODIMENTS

Figure 1:
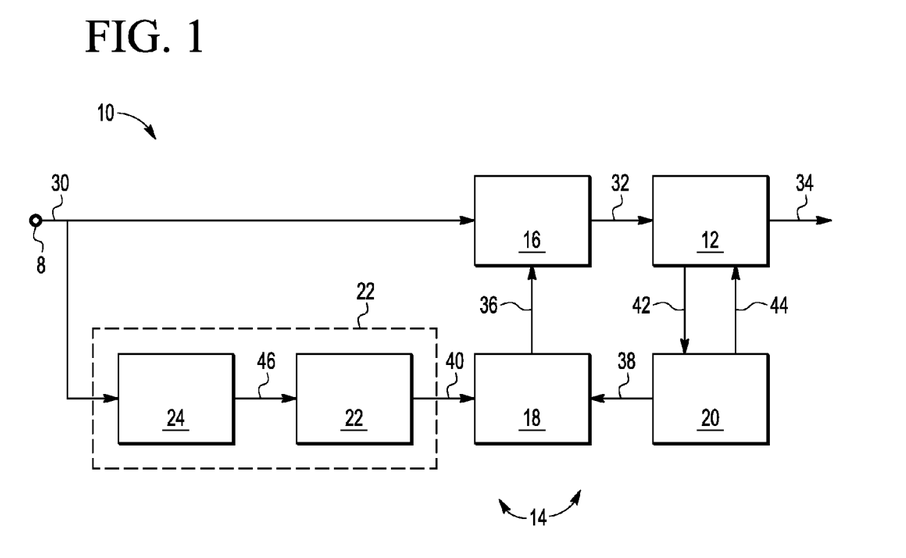
FIG. 1 schematically shows an example of an embodiment of a CAN bit stream processing device.

FIG. 1 schematically shows an example of a CAN bit stream processing device 10, referred to herein also as the device 10. The device 10 notably comprises a CAN bit stream processor 12 for processing an input bit stream 30. The input bit stream 30 may for example be received by the device 10 from a bus (not shown) of a CAN SWU/PN network, for instance in a vehicle. The processor 12 may be a node of this network. The main interest of the present disclosure lies in an application in which the processor 12 supports CAN but does not support CAN FD. However, the processor 12 not supporting CAN FD is not necessary for the device 10 to operate in accordance with the present teaching. In other words, the processor 12 may or may not support CAN FD.

The input bit stream 30 may contain CAN frames as well as CAN FD frames. In one scenario, some of the CAN frames in the input bit stream 30 are intended for the processor 12 whereas none of the CAN FD frames is intended for the processor 12. The processor 12 may be arranged to process the CAN frames intended for it and to generate an output signal 34 on the basis of the payload data conveyed by these CAN frames. The payload data may for example contain information from a sensor (not shown) connected to the bus (not shown).

In an example in which the processor 12 does not support CAN FD or does not fully support CAN FD, reception of a CAN FD frame by the processor 12 may prompt the processor 12 to react in an undesired manner, as explained above. For instance, a CAN FD frame may wake up the processor 12 although the processor 12 is incapable of correctly interpreting the payload data of the received CAN FD frame, resulting in an unnecessary rise in power consumption. Furthermore, reception of a CAN FD frame by the processor 12 could prompt processor 12 to generate a large number of error messages, possibly resulting in a shutdown of the processor 12 or other units within the network.

These problems may at least partially be overcome through the use of additional circuitry 14 connected to the processor 12. The additional circuitry 14 may also be referred to herein as a wrapper unit 14. The wrapper unit 14 may form an interface between a source 8 of the input bit stream 30 and the processor 12. The wrapper unit 14 may, in essence, be arranged to suppress any CAN FD frames in the input bit stream 30. In the present example, the wrapper unit 14 comprises a CAN FD start-of-frame detector 20, a CAN FD end-of-frame detector 22, and a gate unit 16 controllable to feed or not to feed the input bit stream 30 to the processor 12.

More specifically, the CAN FD start-of-frame detector 20 may be arranged to detect the start of a CAN FD frame in the input bit stream 30. In the shown example, the CAN FD start-of-frame detector 20 detects the start of any CAN FD frame in the input bit stream 30 by using start-of-frame information 42 extracted from the input bit stream 30 by the processor 12.

The CAN FD start-of-frame detector 20 may further be arranged to generate a mode control signal 44 when it has detected the start of a CAN FD frame, for indicating to the bit stream processor 12 that the bit stream processor 12 should operate in a neutral or non reactive mode, e.g., an idle mode. The bit stream processor 12 may thus be prevented from taking certain actions in response to one or more subsequent bits of the detected CAN FD frame. For example, the bit stream processor may be arranged to stop all bit processing and error detection. It is noted, however, that merely setting the bit stream processor to the idle mode could be insufficient to prevent every possible kind of reaction by the bit stream processor 12 in response to the input bit stream 30. For example, depending on the implementation in question, the bit stream processor 12 could return from the idle mode to a normal mode after a certain time, thus becoming again responsive to the input bit stream 30. Furthermore, depending on the implementation, the bit stream processor 12 could increment an error counter in response to receiving bits at the high data rate, even when the bit stream processor 12 is in the idle mode. This problem may be overcome by means of the gate unit 16, which may be arranged to selectively feed and not feed the input bit stream 30 to the bit stream processor 12, as described below.

In another example (see FIG. 2 described further below) the CAN FD start-of-frame detector 20 may detect the start of a CAN FD frame directly from the input bit stream 30, that is, without depending on information provided by the processor 12.

Turning again to FIG. 1, the CAN FD end-of-frame detector 22 is arranged to detect the end of a CAN FD frame in the input bit stream 30. An example of a method for detecting the end of a CAN FD frame will be described in greater detail further below.

The gate unit 16 is arranged not to feed the input bit stream 30 to the CAN bit stream processor 12 when the CAN FD start-of-frame detector as detected the start of a CAN FD frame and to feed the input bit stream 30 to the CAN bit stream processor 12 when the CAN FD end-of-frame detector 22 has detected the end of the CAN FD frame. The gate unit 16 thus provides the CAN bit stream processor 12 with a gated bit stream 32 generated from the input bit stream 30 by substantially suppressing every CAN FD frame in the input bit stream 30. For instance, the gate unit 16 may have an on state in which it outputs the input bit stream 30 as the gated bit stream 32 and an off state in which it outputs a void signal as the gated bit stream 32, the void signal being, for example, a constant low level, interpretable as a sequence of dominant bits. The gate unit 16 may thus be switched off in response to detection of the start of a CAN FD frame in the input bit stream 30 and be switched on in response to detection of the end of the CAN FD frame in the input bit stream 30. Depending on a delay between the instant of detecting the start of the CAN FD frame and switching off the gate unit 16, an initial portion of each CAN FD frame may still be present in the gated bit stream 32, the initial portion including at least a start-of-frame indication of the respective CAN FD frame. The delay between detecting the start of a CAN FD frame and switching off the gate unit 16 should be as short as technically possible and in any case sufficiently short to suppress any high data rate bits in the CAN FD frame, thus preventing the CAN bit stream processor 12 from receiving any high data rate bits.

In the present example, the wrapper unit 14 comprises a gate control unit 18 arranged to control the gate unit 16 in dependence on a start-of-frame detection signal 38 provided by the CAN FD start-of-frame detector 20 and an end-of-frame detection signal 40 provided by the CAN FD end-of-frame detector 22. More specifically, the gate control unit 18 may have a first input connected to an output of the CAN FD start-of-frame detector 20 for receiving the start-of-frame detection signal 38 and a second input connected to an output of the CAN FD end-of-frame detector 22 for receiving the end-of-frame detection signal 40. The CAN FD start-of-frame detector 20 may for example be arranged to signal detection of the start of a CAN FD frame by outputting a predefined start-of-frame detection bit sequence indicating that the start of a CAN FD frame has been detected. In a simple example, the start-of-frame detection bit sequence consists of a single recessive bit. Similarly, the CAN FD end-of-frame detection unit 22 may output, as the end-of-frame detection signal 40, a predefined end-of-frame detection bit sequence indicating that it has detected the end of a CAN FD frame. In a simple example, the end-of-frame detection sequence consists of a single recessive bit.

The gate control unit 18 may have an on state in which it outputs an on signal, e.g., a high voltage level, as a gate control signal 36 and an off state in which it outputs, e.g., a low level as the gate control signal 36, to control the gate unit 16. For example, the gate control unit 18 may be arranged to assume its off state in response to detecting the start-of-frame bit sequence in the start-of-frame detection signal 38 and to assume its on state in response to detecting the end-of-frame bit sequence in the end-of-frame detection signal 40. The start-of-frame information 42 provided by the CAN bit stream processor 12 to the start-of-frame detector 20 may for instance contain or consist in the value of a bit extracted by the CAN bit stream processor 12 from a control field of a received CAN or CAN FD frame. For example, the CAN bit stream processor 12 may be arranged to output, as the information 42, the second bit of the control field of any detected CAN or CAN FD base format frame. This bit is referred to as the R0 bit of a CAN base format frame and as the EDL bit of a CAN FD base format frame. This bit, i.e., R0 in the case of a CAN base format frame and EDL in the case of a CAN FD base format frame, is dominant, i.e. zero or low, for a CAN base format frame and recessive, i.e. one or high, for a CAN FD base format frame and thus differentiates between a CAN base format frame and a CAN FD base format frame (cf. the CAN FD specification by Bosch). In addition, the CAN bit stream processor 12 may be arranged to provide, as the start-of-frame information 42, the first bit of the control field of any CAN or CAN FD extended format frame contained in the input bit stream 30. The first bit of the control field is referred to as R1 in the case of CAN extended format and as EDL in the case of CAN FD extended format and it is dominant, i.e. zero or low for the CAN extended format and recessive, i.e. zero or high, for the CAN FD extended format. In conclusion, the start-of-frame information 42 provided by the CAN bit stream processor 12 may consist in a bit that is dominant in the case of CAN frames and recessive in the case of CAN FD frames.

It may be desirable to operate the wrapper unit 14 at a clock rate that is insufficient for correctly sampling any high data rate bits in the input bit stream 30. For instance, a clock signal having a relatively low frequency, namely a frequency insufficient for sampling any high data rate bits, may be used to clock both the CAN bit stream processor 12 and the wrapper unit 14. Accordingly, the CAN FD end-of-frame detector 22 of the present example may be incapable of correctly sampling any high data rate bits in the input stream 30. Nevertheless it is designed such that a risk of misinterpreting a sequence of high data rate bits as an end-of-frame field is avoided. In this respect it is noted that the end of any CAN or CAN FD data frame is characterized by an end-of-frame field consisting of a succession of seven or more recessive bits. The end of a CAN or CAN FD frame may therefore be detected by detecting the end-of-frame field of the respective frame. Undersampling a sequence of high data rate bits may however also result in a succession of seven or more recessive bits even when the undersampeled sequence contains one or more dominant high data rate bits. This is explained by the fact that these dominant high data rate bits may pass unnoticed in the undersampling procedure. This problem is solved by the design of the CAN FD end-of-frame detector 22 described below.

The CAN FD end-of-frame detector 22 (see FIG. 1) comprises a dominant bit stretcher 24 and a recessive bit counter 26 connected to the dominant bit stretcher 24. The dominant bit stretcher 24 has a stretched bit transmission time associated with it and is arranged to stretch the bit transmission time of each dominant bit succeeding a recessive bit in the input bit stream 30 to the stretched bit transmission time, thus generating a conditioned input bit stream 46. The stretched bit transmission time may notably be longer than the bit transmission time of a high data rate bit. Each dominant (i.e., low) bit succeeding a recessive (i.e., high) bit in the input bit stream 30 may thus be detected by sampling the input bit stream 30 at a sampling rate that can be too low for correctly sampling the original, i.e. non-conditioned, input bit stream 30. The stretched bit transmission time may, for example, be identical to the transmission time of a normal data rate bit. In one example, the normal data rate is 500 kilobits per second, the high data rate is 8 megabits per second and the corresponding transmission times are 125 nanoseconds for the high data rate and 2 microseconds for the normal data rate. The dominant bit stretcher 24 may for example comprise a falling edge detector (not shown) arranged to trigger a stretched dominant bit in response to each falling edge of the input bit stream 30.

The recessive bit counter 26 is arranged to provide a recessive bit count, i.e., a value representative of a number of counted recessive bits in the input bit stream 30. To this end, the recessive bit counter 26 is arranged to sample the conditioned input bit stream 30 at a bit counter rate, thereby generating a sampled bit stream. Furthermore, the recessive bit counter 26 is arranged to reset the recessive bit count in response to each dominant bit in the sampled bit stream and to increment the recessive bit count in response to each recessive bit in the sampled bit stream. Conveniently, the bit counter rate is sufficiently high to ensure that each dominant bit stretched by the dominant bit stretcher 24 is sampled by the recessive bit counter 26 and will thus reset the recessive bit count. Furthermore, the bit counter rate should be sufficiently high to ensure that each recessive normal data rate bit in the conditioned input bit stream will prompt the recessive bit counter 26 to increment the recessive bit count. For example, the bit counter rate may be at least twice the normal data rate and also at least twice the inverse of the stretched bit transmission time. The stretched bit transmission time may conveniently be chosen equal to the normal data rate bit transmission time, i.e. equal to the duration of a normal data rate bit, that is, the inverse of the normal data rate. For instance, when the normal data rate is, e.g., 500 kilobits per second, the stretched bit transmission time may conveniently be 1/(500 kB/s)=2 microseconds The bit counter rate should in this case be at least 1 megabit per second, i.e., the recessive bit counter 26 should sample the conditioned input bit stream 46 at a rate of at least 1 megabit per second. The bit counter rate may however be considerably lower than the minimum data rate of, e.g., 16 megabits per second that would be required for fully sampling the high data rate portions of any CAN FD frames in the input bit stream 30, in an example in which the high data rate is 8 megabits per second.

The end-of-frame detection signal 40 may for example consist in the recessive bit count provided by the recessive bit counter 26 or be derived therefrom. For example, the gate control unit 18 may be arranged to switch the gate unit 16 on in response to the recessive bit count reaching a predefined value. This predefined value depends on the number of successive recessive bits that characterize the end of a CAN FD frame in accordance with the CAN FD protocol. As mentioned above, this number may for example be seven.

The example of a recessive bit counter 26 described herein may thus be clocked by a clock signal having a clock frequency considerably lower than the high bit rate of the CAN FD frames in the input bit signal 30. This makes it particularly suitable for use with a CAN bit stream processor clocked by a clock signal having a clock rate lower than the high data rate. In this case, the same clock signal may be used for clocking both the CAN bit stream processor 12 and the wrapper unit 14. Furthermore, even in an implementation in which the CAN bit stream processor 12 is clocked at a clock rate sufficiently high for it to be able, in principle, to process the high data rate portions of the CAN FD frames in the input bit stream 30, operating the wrapper unit 14 at a lower clock frequency may save power.

Figure 2:
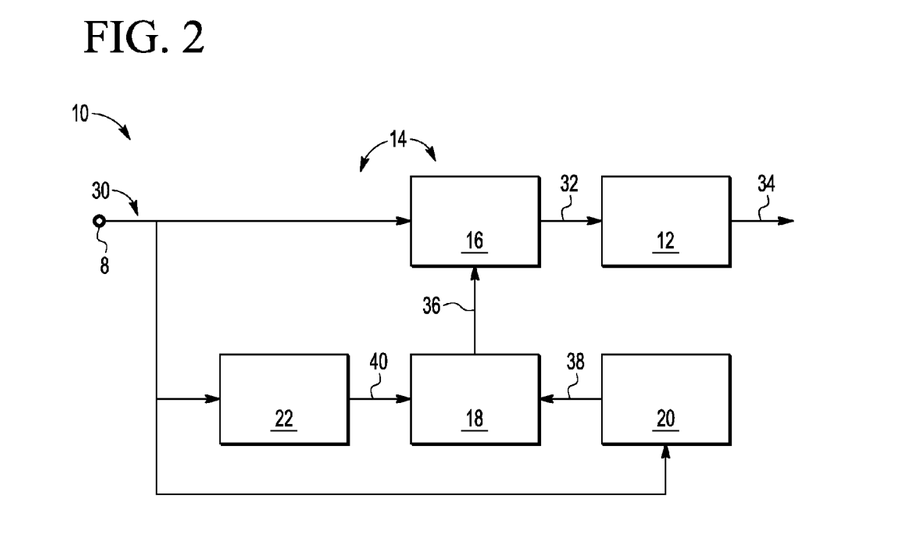
FIG. 2 schematically shows another example of an embodiment of a CAN bit stream processing device.

FIG. 2 shows an example of a bit stream processing device 10 which differs from the one shown in FIG. 1 substantially only in that the CAN FD start-of-frame detector 20 is arranged to receive the input bit stream 30 rather than a signal from the CAN bit stream processor 12, and to detect the start of any CAN FD frames directly from the input bit stream 30.

Figure 3:
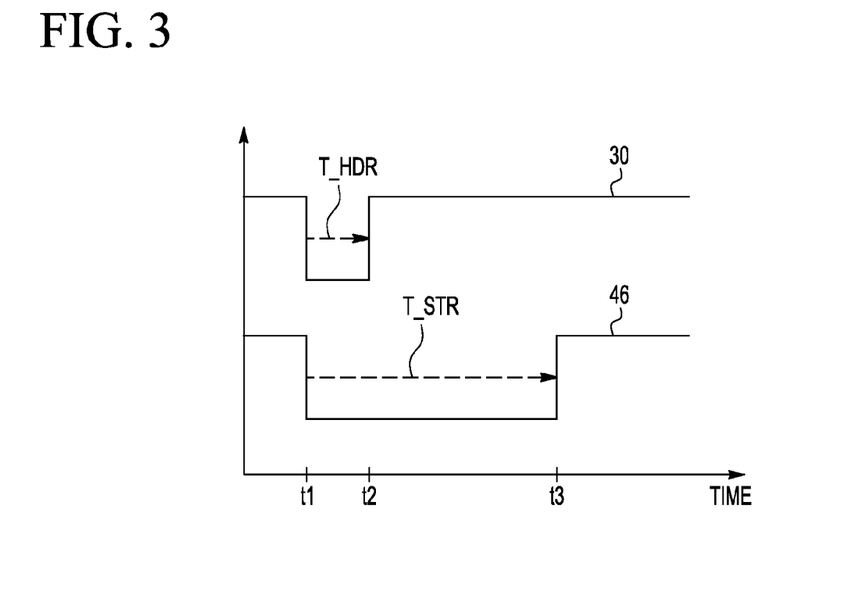
FIG. 3 shows a diagram of an example of a portion of an input bit stream and a corresponding portion of a conditioned input bit stream.

Turning now to FIG. 3, an example of a bit stretching operation performed by, e.g., the bit stretcher 24 (see FIG. 2) is described. In this example, the input bit stream 30 comprises a dominant bit transmitted between times t1 and t2 and having a bit transmission time T_HDR equals t2−t1. In this example, this dominant bit succeeds a recessive bit (transmitted from t0 to t1). Accordingly, the dominant bit stretcher 24 may generate a conditioned input bit stream 46 in which the dominant bit between t1 and t2 in the input bit stream 30 is translated into a stretched dominant bit transmitted between times t1 and t3. The stretched dominant bit has a bit transmission time T_STR=t3−t1 that may be longer than the bit transmission time T_HDR of the original dominant bit in the input bit stream 30 to ensure that the recessive bit counter 26 will reset the recessive bit count in response to the stretched dominant bit in the conditioned input bit stream 46. It is noted that the bit stretching operation described herein may omit part of the information conveyed by the input bit stream 30. For instance, in the example of FIG. 3, the recessive bits of the input bit stream 30 between times t2 and t3 are not translated into the conditioned input bit stream 46. This loss of information may have no consequence as the data contained in the CAN FD frames is not intended to be processed by the CAN bit stream processor 12.

Figure 4:
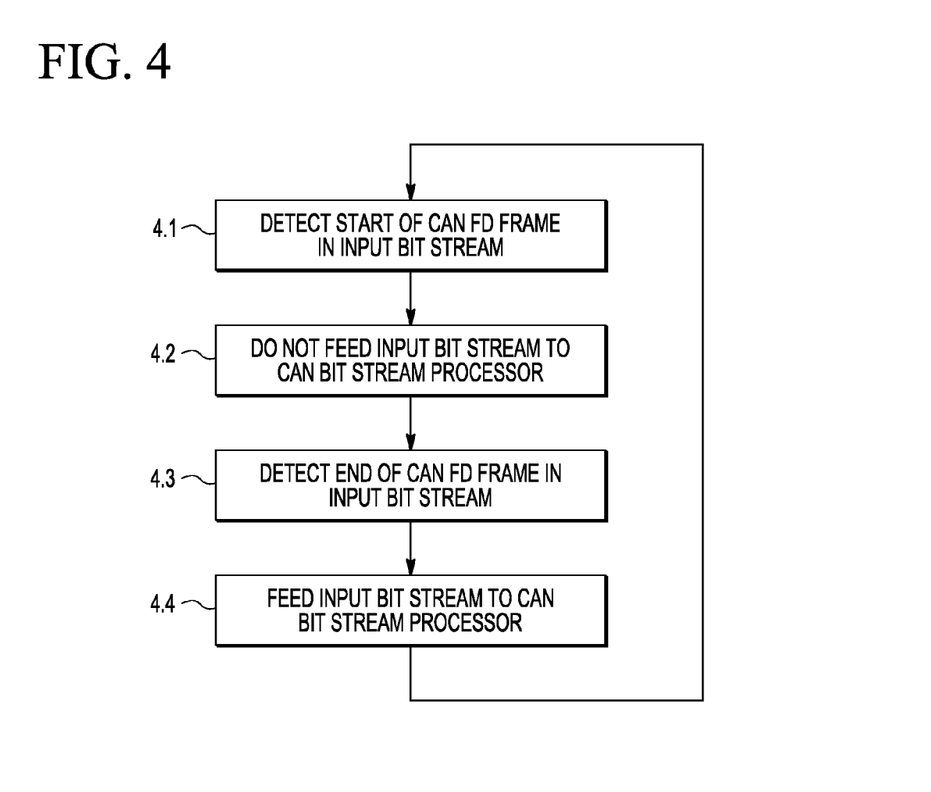
FIG. 4 shows a flow chart of an example of an embodiment of a method of operating a CAN bit stream processor.

The flow chart in FIG. 4 illustrates an example of operating a CAN bit stream processor, e.g. the CAN bit stream processor 12 shown in FIGS. 1 and 2. In this example, the start of a CAN FD frame in the input bit stream 30 is detected (box 4.1). Accordingly, the input bit stream 30 is not fed to the CAN bit stream processor 12 (4.2). The CAN bit stream processor 12 may thus be prevented from receiving any further data contained in the CAN FD frame. As a consequence, the CAN bit stream processor 12 may not be prompted to take any action in response to the CAN FD frame. In particular, it may, for example, remain in a low power mode and it may not trigger an error message.

The end of the CAN FD frame may then be detected in the input bit stream 30 (box 4.3). The end of the CAN FD frame may, for example, be detected by detecting a succession of, e.g., seven successive recessive bits in the input bit stream 30 using, e.g., the CAN FD end-of-frame detector 22. In response thereto, the input bit stream 30 may be fed to the CAN bit stream processor 12 (box 4.4). This sequence of operations (box 4.1 to box 4.4) may be cyclically repeated.

Figure 5:
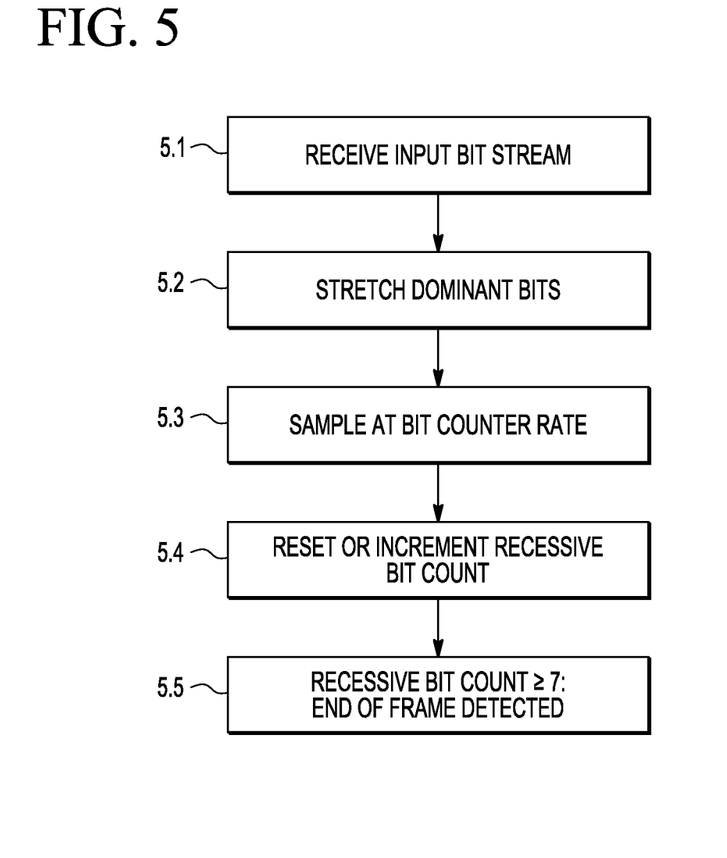
FIG. 5 shows a flow chart of an example of an embodiment of a method of detecting the end of a CAN FD frame.

An example of a method of detecting the end of a CAN FD frame is schematically illustrated by the flow chart in FIG. 5. The method may involve the operations of receiving an input bit stream (box 5.1), stretching dominant bits of the input bit stream (box 5.2), thereby generating a conditioned input bit stream; sampling the conditioned input bit stream at a bit counter rate (box 5.3); resetting or incrementing a recessive bit count in dependence on each bit of the sampled bit stream (box 5.4); and detecting the end of a CAN FD frame by determining that the recessive bit count has reached the number of recessive bits of an end-of-frame field of the CAN FD protocol (box 5.5). The number of recessive bits in the end-of-frame field may for instance be seven. However, in a variant of the CAN FD protocol, the number of successive recessive bits which characterize the end of a CAN FD frame may be smaller or greater than seven.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

The bit transmission time associated with a bit stream is the inverse of the bit rate of the bit stream. In other words, it is the period during which a certain bit of the bit stream is represented by, e.g., a voltage level.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the wrapper unit 14 may be integrated in the CAN bit stream processor 12. Also, the gate unit 16 and the gate control unit 18 may be integrated in the gate unit 16.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the CAN bit stream processor 12 and the wrapper unit 14 may be located on a single integrated circuit, as shown in FIG. 1. Alternatively, the examples may be implemented as any number of separate integrated circuits or separate devices interconnected with each other in a suitable manner. For example, one or more functional units of the wrapper unit 14 may be connected to or otherwise coupled to the CAN bit stream processor 12 but located on a separate device (not shown).

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A CAN FD end-of-frame detector for detecting the end of a CAN FD frame in an input bit stream, the CAN FD frame comprising one or more portions provided at a normal bit rate and one or more portions provided at a high bit rate, the one or more portions provided at the normal bit rate including an end-of-frame field consisting of a succession of seven or more recessive bits, wherein the CAN FD end-of-frame detector comprises:
    a dominant bit stretcher having associated with the dominant bit stretcher a stretched bit transmission time, the dominant bit stretcher being arranged to stretch the bit transmission time of each dominant bit succeeding a recessive bit in the input bit stream to the stretched bit transmission time, thus generating a conditioned input bit stream;
    a recessive bit counter for providing a recessive bit count, wherein the recessive bit counter is arranged to sample the conditioned input bit stream at a bit counter rate, thus generating a sampled bit stream, wherein the recessive bit counter is arranged to reset the recessive bit count in response to each dominant bit in the sampled bit stream and to increment the recessive bit count in response to each recessive bit in the sampled bit stream.

2. The CAN FD end-of-frame detector of claim 1, wherein the dominant bit stretcher is arranged to perform said operation of stretching the bit transmission time of the respective dominant bit by outputting a stretched dominant bit in response to the falling edge preceding the respective dominant bit.

3. The CAN FD end-of-frame detector of claim 1, wherein the bit counter rate is at least twice the normal data rate and at least twice the inverse of the stretched bit transmission time.

4. The CAN FD end-of-frame detector of claim 1, wherein the stretched bit transmission time is longer than the bit transmission time associated with the high data rate.

5. The CAN FD end-of-frame detector of claim 1, wherein the stretched bit transmission time is equal to the bit transmission time associated with the normal data rate.

6. A CAN bit stream processing device, comprising:
    a CAN bit stream processor for processing an input bit stream;
    a CAN FD start-of-frame detector arranged to detect the start of a CAN FD frame in the input bit stream; and
    a CAN FD end-of-frame detector as set forth in claim 1, arranged to detect the end of a CAN FD frame in the input bit stream; and
    a gate unit arranged not to feed the input bit stream to the CAN bit stream processor in response to the CAN FD start-of-frame detector detecting the start of a CAN FD frame and arranged to feed the input bit stream to the CAN bit stream processor in response to the CAN FD end-of-frame detector detecting the end of the CAN FD frame.

7. The CAN bit stream processing device of claim 6, wherein the CAN bit stream processor is arranged to extract start-of-frame information from the input bit stream and to provide the start-of-frame information to the CAN FD start-of-frame detector, the CAN FD start-of-frame detector being arranged to detect the start of a CAN FD frame on the basis of the start-of-frame information.

8. A method for detecting an end-of-frame of a CAN FD frame in an input bit stream, the CAN FD frame comprising one or more portions provided at a normal bit rate and one or more portions provided at a high bit rate, the one or more portions provided at the normal bit rate including an end-of-frame field consisting of a succession of seven or more recessive bits, wherein the method comprises:
    providing a recessive bit count;
    defining a stretched bit transmission time longer than the bit transmission time associated with the high data rate;
    stretching the bit transmission time of each dominant bit succeeding a recessive bit in the input bit stream to the stretched bit transmission time, thus generating a conditioned input bit stream;
    sampling the conditioned input bit stream at a bit counter rate, thus generating a sampled bit stream;
    resetting the recessive bit count in response to each dominant bit in the sampled bit stream; and
    incrementing the recessive bit count in response to each recessive bit in the sampled bit stream.

9. A method of operating a CAN bit stream processor, comprising:
    receiving an input bit stream;
    detecting the start of a CAN FD frame in the input bit stream, and, in response thereto, not feeding the input bit stream to the CAN bit stream processor; and detecting the end of the CAN FD frame in the input bit stream, and, in response thereto, feeding the input bit stream to the CAN bit stream processor;

wherein the CAN FD frame comprises one or more portions provided at a normal bit rate and one or more portions provided at a high bit rate, the one or more portions provided at the normal bit rate including an end-of-frame field consisting of a succession of seven or more recessive bits, and wherein said operation of detecting the end of the CAN FD frame comprises:

providing a recessive bit count;

defining a stretched bit transmission time longer than the bit transmission time associated with the high data rate;

stretching the bit transmission time of each dominant bit succeeding a recessive bit in the input bit stream to the stretched bit transmission time, thus generating a conditioned input bit stream;

sampling the conditioned input bit stream at a bit counter rate, thus generating a sampled bit stream;

resetting the recessive bit count in response to each dominant bit in the sampled bit stream; and incrementing the recessive bit count in response to each recessive bit in the sampled bit stream.

* * * * *